(12) United States Patent
Yin et al.

(10) Patent No.: US 10,968,538 B1
(45) Date of Patent: Apr. 6, 2021

(54) FULLY DULL POLYESTER DRAWN YARN AND PREPARING METHOD THEREOF

(71) Applicant: JIANGSU HENGLI CHEMICAL FIBRE CO., LTD., Wujiang (CN)

(72) Inventors: Lixin Yin, Wujiang (CN); Feng Chen, Wujiang (CN); Xiaohua Sun, Wujiang (CN)

(73) Assignee: JIANGSU HENGLI CHEMICAL FIBRE CO., LTD, Wujiang (CN)

( * ) Notice: Subject to any disclaimer, the term of this patent is extended or adjusted under 35 U.S.C. 154(b) by 0 days.

(21) Appl. No.: 17/042,963

(22) PCT Filed: Oct. 29, 2019

(86) PCT No.: PCT/CN2019/113843
§ 371 (c)(1),
(2) Date: Sep. 29, 2020

(87) PCT Pub. No.: WO2020/134495
PCT Pub. Date: Jul. 2, 2020

(30) Foreign Application Priority Data

Dec. 27, 2018 (CN) .......................... 201811614058.X

(51) Int. Cl.
| | |
|---|---|
| *D01F 6/92* | (2006.01) |
| *D01D 5/253* | (2006.01) |
| *D01F 1/10* | (2006.01) |
| *D01D 5/088* | (2006.01) |
| *C08G 63/695* | (2006.01) |
| *C08G 63/46* | (2006.01) |
| *C08G 63/86* | (2006.01) |
| *C08G 63/183* | (2006.01) |
| *C08K 5/524* | (2006.01) |
| *C08K 5/521* | (2006.01) |
| *C08G 63/682* | (2006.01) |
| *C08K 3/36* | (2006.01) |
| *C08K 3/22* | (2006.01) |

(52) U.S. Cl.
CPC ............... *D01F 6/92* (2013.01); *C08G 63/46* (2013.01); *C08G 63/6826* (2013.01); *C08G 63/866* (2013.01); *C08K 3/22* (2013.01); *C08K 3/36* (2013.01); *D01F 1/10* (2013.01); *C08K 2003/222* (2013.01); *C08K 2003/2227* (2013.01)

(58) Field of Classification Search
None
See application file for complete search history.

(56) References Cited

U.S. PATENT DOCUMENTS

2011/0301305 A1* 12/2011 Isono ................ C08G 63/6826
525/434

FOREIGN PATENT DOCUMENTS

| CN | 102000584 A | | 4/2011 |
|---|---|---|---|
| CN | 106367835 A | | 2/2017 |
| CN | 107988648 A | | 5/2018 |
| CN | 108034200 A | | 5/2018 |
| CN | 109721751 A | | 5/2019 |
| CN | 109735930 A | | 5/2019 |
| CN | 109735941 A | * | 5/2019 |
| CN | 109750379 A | * | 5/2019 |
| WO | 2018047192 A1 | | 3/2018 |

OTHER PUBLICATIONS

CN109750379 English Machine Translation prepared Jan. 11, 2021. (Year: 2021).*
CN109735941 English Machine Translation prepared Jan. 11, 2021. (Year: 2021).*

* cited by examiner

*Primary Examiner* — Christopher M Rodd
(74) *Attorney, Agent, or Firm* — Bayramoglu Law Offices LLC

(57) ABSTRACT

A type of fully dull polyester drawn yarns and a preparing method thereof are disclosed. The preparing method is to melt spinning a modified polyester with the fully drawn yarn (FDY) technique, and the modified polyester is a product of an esterification and successive polycondensation reactions of evenly mixed terephthalic acid, ethylene glycol, 2,5,6,6-tetramethyl-2,5-heptanediol, a fluorinated dicarboxylic acid, a matting agent, a calcined multiphase solid acid base powder and a doped $Bi_2O_3$ powder. The obtained fiber has an intrinsic viscosity drop of 18-26% when stored at 25° C. and R.H. 65% for 60 months. The method of improving the degradation performance of polyester fiber through the incorporation of 2,5,6,6-tetramethyl-2,5-heptanediol, the fluorinated dicarboxylic acid, the doped $Bi_2O_3$ powder and the calcined multiphase solid acid base powder is easy to operate.

17 Claims, No Drawings

FULLY DULL POLYESTER DRAWN YARN AND PREPARING METHOD THEREOF

CROSS REFERENCE TO THE RELATED APPLICATIONS

This application is the national phase entry of International Application No. PCT/CN2019/113843, filed on Oct. 29, 2019, which is based upon and claims priority to Chinese Patent Application No. 201811614058.X, filed on Dec. 27, 2018, the entire contents of which are incorporated herein by reference.

TECHNICAL FIELD

The present invention belongs to the field of polyester fiber, and more particularly, relates to one type of fully dull polyester drawn yarns and preparing method thereof.

BACKGROUND

With the rapid expansion of polyester production capacity, the world polyester fiber market has been full of competition with a heavily squeezed profit margin. Only through the continuous technological innovation to develop and manufacture the products with high technology content and added value, can the polyester fiber producers gain profits and keep market position. Concerning polyethylene terephthalate (PET) fiber, differentiation and functionalization has become the main industrial direction. Due to their smooth surface and certain transparency, polyester fibers tend to reflect most illumination light and show a dazzling and uncomfortable luster, commonly known as glare. Fortunately, the glare can be dimmed by guiding the reflective light to different directions through a small amount of particles with heterologous refractive index, which is usually called extinction treatment, and the added material is known as matting agent. The fully dull fiber has good shading performance and the relevant fabrics also have a certain anti-ultraviolet capability, showing a good prospect and a wider profit margin in the market.

In polyester fiber production, titania ($TiO_2$) is widely used as matting agent because of its high refractive index (2.60 prior to 1.00 of the air), chemical stability, good dispersion, water-infusibility and durability against post-treatment and washing. Furthermore, nano titania is a kind of stable, non-toxic and tasteless ultraviolet absorbent. The fabric containing nano titania has the function of anti ultraviolet suitable for sports clothes, swimsuits, tents and so on. According to the market research, there is a large demand for fully dull polyester filament in the field of high-grade clothing and decoration, owing to the soft handle, mild luster, bright color and good drape feeling provided by the fully dull fabrics.

However, with the rapid development of PET industry, although PET will not directly cause harm to the environment, the difficulties in the PET waste treatment can indirectly increase environmental pressure due to its huge amount and strong resistance to atmospheric and microbial degradation. Actually, the number of waste clothing is increasing year by year with the increasing living standard, just in china nearly 30 million tons of waste clothing are produced every year. At present, landfill, incineration and recovery are the main methods to treat PET waste, from the environmental protection point of view, landfill and incineration are easy but dirty. Conversely, the degradation recovery has been believed as an efficient and scientific treatment for PET waste. However, the tight structure, the high crystallinity and the long natural degradation time of PET bring much restriction to the degradation recovery, and the highest proportion of recycling for common PET fabric in U.S. is just about 13% whereas in China that is even low as 10%. In practical application, chemical degradation methods are mostly used for PET, including hydrolysis and alcoholysis, as well as ammonolysis, amination and pyrolysis, however, they are still far from solving the recycling of a large number of waste clothing because of the problems such as slow degradation rate and poor degradation effect. As matter of fact, the natural degradation of clothing polyester fiber (PET filament) has become an urgent problem in view of the needs of environmental protection, resource conservation and sustainable development.

Therefore, it is of great significance to develop a kind of fully dull polyester drawn yarn with high degradation speed and high degradation efficiency.

SUMMARY

The primary object of the present invention is to provide one kind of fully dull polyester drawn yarn with high degradation speed and high degradation efficiency as well as the preparing method thereof, so as to overcome the inadequacies in the clothing polyester fiber (PET filament) made from the existing technology.

To this end, the key technical points of the invention are as follows.

The preparing method of fully dull polyester drawn yarn is to melt spinning a modified polyester with a fully drawn yarn (FDY) technique;

wherein said modified polyester is the product of the esterification and the successive polycondensation reactions of evenly mixed terephthalic acid, ethylene glycol, 2,5,6,6-tetramethyl-2,5-heptanediol, fluorinated dicarboxylic acid, matting agent, calcined multiphase solid acid base powder and doped $Bi_2O_3$ powder;

wherein said 2,5,6,6-tetramethyl-2,5-heptanediol has a molecular formula as

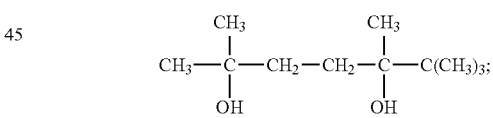

wherein said fluorinated dicarboxylic acids could be 2,2-difluoro-1,3-malonic acid, 2,2-difluoro-1,4-succinic acid, 2,2-difluoro-1,5-glutaric acid or 2,2,3,3-tetrafluoro-1,4-succinic acid;

wherein said matting agent has an additive amount equal to or larger than 2 wt %;

wherein said multiphase solid acid base could be $SiO_2$—$Al_2O_3$ and/or $SiO_2$—MgO calcined at 400-700° C.;

wherein said doped $Bi_2O_3$ is obtained through a process of evenly mixing $Ca^{2+}$ solution and $Bi^{3+}$ solution at first, then adding in the precipitant until the pH=9-10, and finally calcining the precipitate.

Herein the polyester is modified by 2,5,6,6-tetramethyl-2,5-heptanediol, in which the tert-butyl groups will change the segment movement mode, the inter-segment force and the inter-segment distance of the polyester main chains so as to enlarge the free volume. Large free volume is favorable to the penetration of air or water into the polyester, hence can improve its natural degradation performance to a certain extent.

Herein the natural degradation performance is further improved by introducing silicated dicarboxylic acid, calcined multiphase solid acid base powder and doped $Bi_2O_3$ powder.

Herein incorporated fluorinated dicarboxylic acid possesses the characteristic of fluorine atom being bonded to α-C. During the hydrolysis process of polyester, the electron cloud density in the C—O bond is reduced by the electron-withdrawing effect of α-C bonded fluorine atom hence the stability of the tetrahedral anion intermediate formed by ester carbonyl together with nucleophilic attacker will also decrease, which is conducive to the nucleophilic addition reaction. Moreover, the steric hindrance of fluorinated dicarboxylic acid is less than that of terephthalic acid, which further promotes the nucleophilic addition reaction. Therefore, the degradation based on the nucleophilic addition of polyester will be significantly accelerated.

Herein incorporated $Bi_2O_3$ powder also has a promotion effect on the natural degradation of polyester and the mechanism is explained as follows. When oxygen reduction catalyst is adopted in polyester, oxygen from air can penetrate into polyester via the free volume, and the oxygen reduction reaction will occur in the surface of catalyst to cause the broken of ester bond, accordingly the polyester degradation will be promoted. However, the further improvement of the degradation efficiency of pure oxygen reduction catalyst is still limited. In the present invention, calcium oxide doped $Bi_2O_3$, instead of the mechanical mixture of calcium oxide and bismuth oxide, is dispersed in the modified polyester. The crystal plane of $Bi_2O_3$ will be destroyed by calcium oxide doping, leading to the following effects. On the one hand, the specific surface area of doped $Bi_2O_3$ increases, which can improve the oxygen adsorption capacity per unit mass of $Bi_2O_3$. Moreover, the oxygen adsorption mode in the surface of doped $Bi_2O_3$ will change to the side type adsorption from the end type adsorption in original monoclinic $Bi_2O_3$, and the adsorption is not affected by the steric hindrance of Bi atom in the surface. With the enhanced chemical adsorption of $O_2$ molecule at the Bi atom site and the improved catalytic efficiency of oxygen reduction, the polyester fiber containing doped $Bi_2O_3$ has a high degradation efficiency, which is conducive to environmental protection.

Herein incorporated multiphase solid acid base can further accelerate the degradation speed of polyester. On one hand, solid base can combine with water to produce $OH^-$ ion with stronger nucleophilic capacity than $H_2O$, on the other hand, solid acid can decompose to release H ion which can protonate the carboxyl oxygen and make it easy to be attacked by a nucleophilic agent with weak alkalinity such as $H_2O$. Accordingly, the problem in the common hydrolysis process of polyester without the modification, such as the weak nucleophilic capacity of water and the low polarity of carboxyl oxygen, could be solved by this acid-base synergistic effect.

The preparation methods of $SiO_2$-$Al_2O_3$ or $SiO_2$—MgO are list as follows:

adding 3-5 wt % of disperser PEG 6000 into a sodium silicate solution with an $SiO_2$ equivalent concentration of 10-15 wt % and stirring the mixture at 40-50° C. till be soluble, then evenly adding in 10-15 wt % of sulfuric acid solution till pH=10, after aging for 0.5-1.0 hr continuing to add in sulfuric acid solution till pH=8, heating the solution to 90-95° C. and aging for 2 hr, filtering the solution under vacuum and washing the residue with water until no $SO_4^{2-}$ detection then further washing with anhydrous ethanol for several times, finally drying the product at 80-85° C. and grinding it to obtain silica powder;

adding 1 part of above silica powder into 50-60 parts of water and stirring to disperse, then dripping in 2-3 parts of aluminum sulfate or magnesium sulfate solution with a weight concentration of 4-5%, adjusting the pH value firstly to neutral and then to 8 with 0.5-1.0 mol/L sodium hydroxide solution and 8-10% sulfuric acid successively, after aging for 1-2 hr filtering the solution under vacuum and washing the residue until no $SO_4^{2-}$ detection, further washing the filter cake with anhydrous ethanol for several times and then drying it at 100° C., finally calcining the product at 400-700° C. for 2-4 hr to obtain solid heteropoly acid $SiO_2$—$Al_2O_3$ or $SiO_2$—MgO.

Herein carried out calcination is to remove unnecessary components such as sulfate radicals and nitrate radicals and to decompose and activate the salt into metallic oxide, which has been well controlled to avoid the evaporation of $SiO_2$ under high temperature and the invalidation of decomposition and activation under low temperature.

The following preferred technology program is presented to give a detailed description for this invention.

In the preparing method of the fully dull polyester drawn yarns hereinabove, for the preparation of doped $Bi_2O_3$, wherein said $Ca^{2+}$ solution is an aqueous one with a concentration of 2-3%, in which the anion is $NO_3^-$; wherein said $Bi^{3+}$ solution is a product of dissolving 20-25 wt % of $Bi_2O_3$ in nitric acid; wherein said precipitant is ammonia water with a concentration of 2 mol/L; wherein said evenly mixed solution has a 5-8:100 of molar ratio of $Ca^{2+}$ respective to $Bi^{3+}$ before precipitation (The oxygen reduction is accelerated by introducing $Ca^{2+}$ ions into the main catalyst $Bi_2O_3$ to increase the conduction rate of oxygen ions in the polyester, hence if the ion molar ratio is too high the performance of $Bi_2O_3$ will be affected whereas if the ion molar ratio is too small the oxygen ion conduction rate cannot be improved obviously);

wherein said precipitate calcining is preceded by a washing and drying process, and the drying is carried out under a temperature of 105-110° C. for 2-3 hr; wherein said calcining includes steps of a 400° C. heating for 2-3 hr, a 700° C. heating for 1-2 hr, a cooling in air and a grinding to obtain particles with an average size less than 0.5 micron (In this invention calcination is a process of importing calcium atom into the crystal lattice of $Bi_2O_3$ to form more defects in the catalyst phase and make them highly dispersed in the surface of solid solution, so as to destroy the crystal plane structure of $Bi_2O_3$. If the cooling rate of calcined precipitate is too slow, calcium oxide or bismuth oxide tends to crystallize independently, which will weaken the destruction of crystal plane, however a cooling in air is conductive to the formation of crystals while not to the destruction of crystal plane).

In the preparing method of the fully dull polyester drawn yarns hereinabove, for the preparation of multiphase solid acid base, wherein said calcining is a high temperature treatment for 2-4 hr; where n said grinding is to obtain particles with an average size less than 0.5 micron; wherein said $SiO_2$—$Al_2O_3$ or $SiO_2$—MgO powder has a $SiO_2$ content of 20-60 wt % and the purpose of this optimization is to ensure the synergistic effect of the solid acid base.

In the preparing method of the fully dull polyester drawn yarns hereinabove, wherein said 2,5,6,6-tetramethyl-2,5-heptanediol is synthesized by means of:

(1) mixing KOH, 3-methyl-3-hydroxybutyne, 3,3-dimethyl-2-butanone and isopropyl ether in the molar ratio of 1-1.2:1:1.2-1.3:2.0-3.0, then carrying out the reaction in an ice bath for 2-4 hr, finally obtaining octyne diol through a series of processes of cooling crystallization, centrifugation, washing, refining and drying;

(2) mixing octyne diol, alcohol and Pd catalyst in the weight ratio of 2-3:10:0.01-0.03, then carrying out the reaction accompanied with a continuous hydrogen input at 40-50° C. for 50-60 min, finally obtaining 2,5,6,6-tetramethyl-2,5-heptanediol through a series of processes of separation and purification.

In the preparing method of the fully dull polyester drawn yarns hereinabove, wherein said modified polyester is prepared by means of:

(1) Esterification concocting terephthalic acid, ethylene glycol, 2,5,6,6-tetramethyl-2,5-heptanediol and fluorinated dicarboxylic acid into a slurry, then adding in the calcined multiphase solid acid base, the doped $Bi_2O_3$, the catalyst, the matting agent and the stabilizer and carrying out the esterification in a nitrogen atmosphere with a pressure of normal value-0.3 MPa at 250-260° C., finally ending the reaction when the water distillation reaching more than 90% of the theoretical value;

(2) Polycondensation for the esterification products, smoothly reducing the pressure to less than 500 Pa (absolute value) within 30-50 min and carrying out reaction at 250-260° C. for 30-50 min, successively, further reducing the pressure to less than 100 Pa (absolute value) and continuing the reaction at 270-282° C. for 50-90 min.

In the preparing method of fully dull polyester drawn yarns hereinabove, the molar ration of terephthalic acid and ethylene glycol is 1:1.2-2.0, and being relative to the amount of terephthalic acid, the total addition of 2,5,6,6-tetramethyl-2,5-heptanediol and fluorinated dicarboxylic acid is 3-5 mol % in a molar ratio of 2-3:3-4, while the addition of the calcined multiphase solid acid base, the doped $Bi_2O_3$, the catalyst, the matting agent and the stabilizer are 0.03-0.05 wt %, 0.04-0.07 wt %, 0.03-0.05 wt %, 2-3 wt % and 0.01-0.05 wt %, respectively. The additive amounts of 2,5,6,6-tetramethyl-2,5-heptanediol, the fluorinated dicarboxylic acid, the doped $Bi_2O_3$ and the calcined multiphase solid acid base have been optimized to improve the degradation performance of the fiber without mechanical strength and crystallinity loss, which could be adjusted according to the actual application but the adjustment range should not be too large, otherwise, under the upper overflow the mechanical and crystallization performance will be effect owing to the destruction of polyester chain regularity whereas under the lower overflow the modification cannot be fully achieved.

In the preparing method of fully dull polyester drawn yarns mentioned above, wherein said catalyst is one of antimony trioxide, ethylene glycol antimony or antimony acetate, wherein said matting agent is titanium dioxide, and wherein said stabilizer is triphenyl phosphate, trimethyl phosphate or trimethyl phosphite;

wherein said modified polyester has a molecular weight of 25000-30000 and a molecular weight distribution index of 1.8-2.2;

wherein said FDY technique includes steps of metering, spinneret extruding, cooling, oiling, stretching, heat setting and winding;

wherein said FDY process involves the technological parameters of spinning temperature 285-295° C., cooling temperature 20-25° C., interlacing pressure 0.20-0.30 MPa, godet roller 1 speed 1600-1800 m/min, godet roller 1 temperature 70-80° C., godet roller 2 speed 3000-3200 m/min, godet roller 2 temperature 105-130° C., winding speed 2950-3130 m/min.

In the present invention the fully dull polyester drawn yarn obtained through the preparing method hereinabove is also provided, which is a type of modified polyester FDY;

wherein said modified polyester has a molecular chain structure composed of terephthalic acid segments, ethylene glycol segments, 2,5,6,6-tetramethyl-2,5-heptanediol segments and fluorinated dicarboxylic acid segments;

wherein said modified polyester is also dispersed with the matting agent, the doped $Bi_2O_3$ powder and the calcined multiphase solid acid base powder, and the content of matting agent is equal to or larger than 2 wt %.

Prepared through the preferred technology program mentioned above, herein obtained fully dull polyester drawn yarn has the following performance indices: monofilament fineness 1.0-3.0 dtex, breaking strength ≥2.0 cN/dtex, elongation at break 42.0±4.0 interlacing degree 19±4/m, linear density deviation rate 1.0%, breaking strength CV value ≤8.0 breaking elongation CV value 510.0%, and boiling water shrinkage rate 50.0±10.5% (which are close to those of the common polyester fiber from the existed techniques and show no obvious decays, moreover, the effect of multiphase solid acid base is of slow-release and can promise the fiber enough strength in 3-5 years under the addition mentioned above).

herein obtained fully dull polyester drawn yarn has an intrinsic viscosity drop of 18-25% after a storage at 25° C. and R.H. 65% for 60 months (the corresponding drop of the contrast sample is just 5%, implying the modification can significantly accelerate the natural degradation rate of PET fiber and be favorable to the fiber recycling).

The mechanism of this invention could be described as follows.

In the present invention, the natural degradation performance of fully dull polyester yarn is improved by the incorporation of comonomer 2,5,6,6-tetramethyl-2,5-heptanediol, as well as the fluorinated dicarboxylic acid, the doped $Bi_2O_3$ and the calcined multiphase solid acid base, effectively solving the problem of polyester fiber recycling.

Firstly, the influence of comonomer 2,5,6,6-tetramethyl-2,5-heptanediol on the natural degradation performance of PET fiber is interpreted as follows.

As a matter of fact, the accumulation of macromolecular chains in polymer are not so compact that there still exist some gaps between those chains, which are known as the free volumes. Enough free volumes are necessary for small molecules to diffuse and penetrate into the polymer, and within certain range, the larger the free volume, the better the diffusivity and the higher the permeability. The free volume can be classified by void one and slit one, and the void free volume is more efficient for the penetration of small molecules. The size and class of free volume are dependent on the polymer structures such as steric hindrance, side group size and side group structure, etc. When a certain site in polymer main chain is substituted by a side group, the mobility of the main chain will be changed, as a result, the interaction force and the distance between polymer chains, as well as the cohesive energy and the free volume of polymer, will vary accordingly. In fact, the polarity, the size and length of side substitution group can draw influences on the rigid, the molecular interaction, and even the free volume of polymer. Therefore, different side groups will lead to different penetration performance.

The backbone conformation of the straight-chain diols, such as ethylene glycol and 1,4-butanediol, is like a zigzag almost lying in a plane. When a H atom of one certain methylene group in the main chain is substituted by a methyl group, the side C atom will locate at one vertex of the tetrahedron formed by the sp3 hybridization of the connected main chain C atom. Meanwhile, the side C atom itself is of sp3 hybridization to form another tetrahedron, therefore, the methyl substitution group cannot lie in the zigzag plane. Furthermore, if the H atoms in methyl group are further substituted by other methyl groups to from a tert-butyl group more such tetrahedrons will be formed. Hence it is easy to understand the tert-butyl substituted polyester will possess a complicated molecular conformation different far from the zigzag to ensure much more void free volumes. However, if a long side chain instead of methyl group is bonded to the polyester backbone, the increase of free volume will be mainly owing to the slit one which is not so sufficient to promote the penetration. Moreover, the long alkyl side chain is easy to cause entanglement because of its flexibility, which is also make against the increase of free volume.

In the present invention, the natural degradation performance of fully dull polyester yarn is improved by introducing 2,5,6,6-tetramethyl-2,5-heptanediol as a comonomer. The existence of 2,5,6,6-tetramethyl-2,5-heptanediol in PET will change the mobility of the main chain so as to change the interaction force and the distance between PET molecular chains, finally enlarging the void free volumes of PET. Compared with short substitution chains such as methyl or ethyl group, the tert-butyl group has a larger space occupation which can gain larger free volume in the molecular aggregate. Whereas compared with long substitution chains, the tert-butyl group will mainly provide the void free volume with larger size than that of the slit free volume which generated mainly by the long side chains, furthermore, the tert-butyl group, with a higher rigidity prior to the long alkyl chains, will seldom cause the entanglement of polymer chains. The enlargement of void free volume favorable to the penetration of water or air molecules into the fiber will increase the reactant concentrations involved in the nucleophilic addition in the hydrolysis of PET, so as to improve the degradation to a certain extent.

Secondly, the influences of the doped $Bi_2O_3$ and the calcined multiphase solid acid base on the natural degradation performance of PET fiber is interpreted as follows.

The hydrolysis of polyester in alkaline medium is a nucleophilic addition-elimination process. During the ester hydrolysis, the nucleophilic addition reaction will occur firstly, in which OH-attacks C atom in ester carbonyl RCOOR' to form a tetrahedral anion intermediate. From this tetrahedral anion, carboxylic acid RCOOH will be formed by eliminating OR' through the broken of ester bond, meanwhile alcohol R'OH can also be obtained from the combination of OR' with $H^+$. However, normally the tetrahedral intermediate has a cramped structure with high steric hindrance, which is detrimental to the nucleophilic addition reaction, hence the ester hydrolysis usually carries on with a rather slow rate. In the present invention, the polyester hydrolysis is significantly accelerated by importing special structural fluorinated dicarboxylic acid, concretely, dicarboxylic acid containing a α-C bonded with fluorine atoms. During the hydrolysis process of polyester, the electron cloud density in the C—O bond is reduced by the electron-withdrawing effect of fluorine atom boned to the α-C hence the stability of the tetrahedral anion intermediate will decrease, which is conducive to the nucleophilic addition reaction. Moreover, the steric hindrance of fluorinated dicarboxylic acid is less than that of terephthalic acid, which further promotes the nucleophilic addition reaction, thus significantly increasing the degradation rate. However, the degradation rate of polyester will not be improved significantly if the imported diol contains fluorine atom bonded to β-C because the electron-withdrawing effect generated by fluorine atom can only pass to adjacent carbon atom but hardly to C—O bond in ester group, hence the attacking of OH— upon carbonyl in nucleophilic addition reaction will not be affected so much.

Moreover, normally the polyester fiber in service will be exposed to the air for a long time. When the polyester contains a certain amount of oxygen reduction catalyst, the oxygen in air can penetration into the polyester through the free volume and will be absorbed and enriched in the surface of oxygen reduction catalyst, then the absorbed oxygen could be partially reduced to peroxide which can combine with ester groups to form RCOOOR'. When the latter further combines with a proton and the O—O bond breaks off, one RCOOH will form through this broken of ester bond, at the same time, OR' can connect with H to produce alcohol HOR'. Through the mechanism mentioned above, the degradation of polyester can be accelerated.

The doping of bismuth oxide together with calcium oxide is realized in this invention via a technological process of solution blending, precipitation and calcining, so as to change the bismuth oxide catalyzed oxygen reduction behavior, through which the degradation rate of polyester is improved. To a certain extent, the closer the dopant ion radius is to the doped ion radius, the easier the formation of oxygen vacancies could be, which is favorable to the conduction of oxygen ions. In this invention, $Ca^{2+}$, with the same radius to $Bi^{3+}$ (both are 0.103 nm), is selected as the doping ion, which can improve the conduction rate of oxygen ions and the degree of oxygen reduction reaction. The effect of doping modification on bismuth trioxide is clarified as follows.

On one hand, the doping mode herein will destroy the crystal plane structure of $Bi_2O_3$ so as to enlarge its specific surface area, hence the oxygen adsorption capacity per unit mass of $Bi_2O_3$ is increased. On the other hand, the doping mode herein will change the adsorption mode and oxygen reduction mechanism of $Bi_2O_3$. Concretely, 02 molecules tend to be adsorbed in the end type through a physical adsorption of low strength or a weak chemical adsorption into the surface of original monoclinic $Bi_2O_3$ and to be reduced to peroxides, in addition, the adsorption will also be affected by the steric hindrance of Bi atom in the surface. Whereas in the doped $Bi_2O_3$, the adsorption changes to the side type which will not be affect by the steric hindrance, and the proportion of chemical adsorption is improved, moreover, the breaking off of 0-0 bond is also promoted, i.e., the oxygen reduction efficiency is increased. Therefore, the degradation of polyester rate will be accelerated by importing doped $Bi_2O_3$. Nevertheless, combining bismuth oxide with calcium oxide just by physical blending cannot lead to the effects mentioned above, because the crystal plane structure, the adsorption mode and the oxygen reduction mechanism of $Bi_2O_3$ will not change in that way. The degradation will start in the surface of fiber made of common polyester, whereas in this invention, a comprehensive degradation with high efficiency could be realized owing to the polyester dispersed with oxygen reduction agent which can maintain oxygen internally for a long time.

Additively, the multiphase solid acid base $SiO_2$-A120 or $SiO_2$—MgO, is prepared from the mixture of silica powder, water, sodium hydroxide and aluminum sulfate or magnesium sulfate through a high-temperature calcining at 400-700° C. The purpose of calcination is to remove unnecessary components such as sulfate radicals and nitrate radicals and to decompose and activate the salt into metallic oxide, which should be well controlled to avoid the evaporation of $SiO_2$ under high temperature and the invalidation of decomposition and activation under low temperature.

Hydrolysis of polyester, the reversal reaction of esterification, essentially is the fracture process of acyl oxygen bond in ester group, which includes the nucleophilic addition of nucleophilic reagent onto carbonyl group to form a tetrahedral intermediate and the elimination of an anion from it. The hydrolysis of common polyester is rather slow, and one reason is $H_2O$ can just act as a weak nucleophilic attacker while the other is in polyester the carbonyl C atom will show very low nucleophilic receptor capacity except for being attacked by strong nucleophilic reagent because it is surrounded by electron donating groups.

In the present invention a multiphase solid acid base is incorporated to accelerate the degradation speed of polyester. On one hand, solid base can combine with water to produce OH-ion with stronger nucleophilic capacity than $H_2O$, on the other hand, solid acid can decompose to release $H^+$ ion which can protonate the carboxyl oxygen and make it easy to be attacked by a nucleophilic agent with weak alkalinity such as $H_2O$. Accordingly, the problem in the common hydrolysis process of polyester without the modification, such as the weak nucleophilic capacity of water and the low polarity of carboxyl oxygen, could be solved by this acid-base synergistic effect.

In a carboxyl group, the lone pair electrons in hydroxyl O atom will be delocalized via conjugating with the r electron of carbonyl group, which will weaken the hydroxyl bond and result in the decomposition of carboxyl group into an anion and a proton. Therefore, normally the end carboxyl group in common polyester is the start of hydrolysis because the released proton will catalyze the nucleophilic addition. More end carboxyl group will be formed from the hydrolysis broken of polyester chain and the hydrolysis can be enhanced by the incorporation of solid acid base just as mentioned above, and so on. Therefore, the addition of solid acid base can efficiently accelerate the natural degradation of polyester.

In conclusion, the present invention provides (1) a type of fully dull polyester drawn yarns with improved recovery performance for good application prospect without quality decay;

(2) a method for preparing the fully dull polyester drawn yarns in which the natural degradation performance of fiber is improved by introducing 2,5,6,6-tetramethyl-2,5-heptanediol, the fluorinated dicarboxylic acid, the doped $Bi_2O_3$ and the calcined multiphase solid acid base as modifiers.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, those technical personnel in this field can make various changes or modifications to the invention, and these equivalent forms also fall within the scope of the claims attached to the application.

Example 1

A method for preparing the fully dull polyester drawn yarns, comprising the steps:

(1) Preparation of Modified Polyester (1.1) Preparation of Multiphase Solid Acid Base $SiO_2$—$Al_2O_3$ adding 4 wt % of disperser PEG 6000 into a sodium silicate solution with an $SiO_2$ equivalent concentration of 12 wt % and stirring the mixture at 45° C. till be soluble, then evenly adding in 12 wt % of sulfuric acid solution till pH=10, after aging for 1.0 hr continuing to add in sulfuric acid solution till pH=8, heating the solution to 95° C. and aging for 2 hr, then filtering the solution under vacuum and washing the residue with water until no $SO4^{2-}$ detection then further washing with anhydrous ethanol for several times, finally drying the product at 80° C. and grinding it to obtain silica powder;

adding 1 part of above silica powder into 55 parts of water and stirring to disperse, then dripping in 2 parts of aluminum sulfate solution with a weight concentration of 4.5%, adjusting the pH value firstly to neutral and then to 8 with 0.5 mol/L sodium hydroxide solution and 8% sulfuric acid successively, after aging for 2 hr filtering the solution under vacuum and washing the residue until no $SO4^{2-}$ detection, further washing the filter cake with anhydrous ethanol for several times and then drying it at 100° C., finally calcining the product at 500° C. for 3 hr to obtain solid acid base $SiO_2$—$Al_2O_3$ with an average size of 0.4 micron and a silica content of 40 wt %;

(1.2) Doping Modification of $Bi_2O_3$ (1.2.1) evenly mixing a 2.5 wt % of $Ca(NO_3)_2$ aqueous solution and a 22 wt % of $Bi_2O_3$ nitric acid solution in 7:100 molar ratio of $Ca^{2+}$ and $Bi^{3+}$;

(1.2.2) depositing the mixed solution by adding 2 mol/L of ammonia water till pH=10, then washing and drying (105° C., 2.5 hr) the precipitate;

(1.2.3) after the treatment composed of a heating at 400° C. for 2.5 hr, a heating at 700° C. for 1.5 hr and a cooling in air, crushing the precipitate to doped $Bi_2O_3$ powder with an average size of 0.45 micron;

(1.3) Synthesizing 2,5,6,6-tetramethyl-2,5-heptanediol (1.3.1) mixing KOH, 3-methyl-3-hydroxybutyne, 3,3-dimethyl-2-butanone and isopropyl ether in the molar ratio of 1:1:1.2:2.0, then carrying out the reaction in an ice bath for 2 hr, finally obtaining octyne diol through a series of processes of cooling crystallization, centrifugation, washing, refining and drying;

(1.3.2) mixing octyne diol, alcohol and Pd catalyst in the weight ratio of 2:10:0.01, then carrying out the reaction accompanied with a continuous hydrogen input at 40° C. for 50 min, finally obtaining 2,5,6,6-tetramethyl-2,5-heptanediol through a series of processes of separation and purification; wherein obtained target compound possessing a molecular structure just as shown in Formula I;

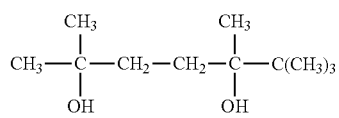

Formula I (1.4) Esterification concocting terephthalic acid, ethylene glycol, 2,5,6,6-tetramethyl-2,5-heptanediol and 2,2-difluoro-1,3-malonic acid into a slurry, then adding in multiphase solid acid base $SiO_2$—$Al_2O_3$, doped $Bi_2O_3$, antimony trioxide, titanium dioxide and triphenyl phosphate and carrying out the esterification in a nitrogen atmosphere with a pressure of 0.3 MPa at 250° C., finally ending the reaction when the water distillation reaching 90.1% of the theoretical value, wherein the molar ration of terephthalic acid and ethylene glycol is 1:1.2, and being relative to the amount of terephthalic acid, the total addition of 2,5,6,6-tetramethyl-2,5-heptanediol and 2,2-difluoro-1,3-malonic acid is 3 mol % in a molar ratio of 2:3, while the addition of multiphase solid acid base $SiO_2$—$Al_2O_3$, doped $Bi_2O_3$, antimony trioxide, titanium dioxide and triphenyl phosphate are 0.03 wt %, 0.04 wt %, 0.03 wt %, 2 wt % and 0.01 wt %, respectively;

(1.5) Polycondensation for the esterification products, smoothly reducing the pressure to 499 Pa (absolute value) within 30 min and carrying out reaction at 250° C. for 30 min, successively, further reducing the pressure to 99 Pa (absolute value) and continuing the reaction at 270° C. for 50 min, finally obtaining the modified polyester with a molecular weight of 25000 and a molecular weight distribution index of 1.8;

(2) Spinning of fully dull polyester drawn yarn through a FDY technological way including stages of metering, spinneret extruding (at 285° C.), cooling (at 20° C.), oiling, stretching as well as heat setting (carried on with the parameters of interlacing pressure 0.20 MPa, godet roller 1 speed 1600 m/min, godet roller 1 temperature 70° C., godet roller 2 speed 3000 m/min, godet roller 2 temperature 105° C.), and winding (2950 m/min), converting the modified polyester into fully dull polyester drawn yarns.

Finally obtained fully dull polyester yarn has an intrinsic viscosity drop of 18% after stored at 25° C. and R.H. 65% for 60 months, and the other property indices are listed in Table 1.

Comparison 1

A method for preparing the fully dull polyester drawn yarns involved steps basically the same as those in Example 1, except for no addition of 2,5,6,6-tetramethyl-2,5-heptanediol, 2,2-difluoro-1,3-malonic acid, multiphase solid acid base $SiO_2$-$Al_2O_3$ and doped $Bi_2O_3$ in step (1), from which the finally obtained fully dull polyester drawn yarn has an intrinsic viscosity drop of 4.8% after stored at 25° C. and R.H. 65% for 60 months, and the other property indices are listed in Table 1.

Comparison 2

A method for preparing the fully dull polyester drawn yarns involved steps basically the same as those in Example 1, except for no addition of 2,5,6,6-tetramethyl-2,5-heptanediol in step (1), from which the finally obtained fully dull polyester drawn yarn has an intrinsic viscosity drop of 12.6% after stored at 25° C. and R.H. 65% for 60 months, and the other property indices are listed in Table 1.

Comparison 3

A method for preparing the fully dull polyester drawn yarns involved steps basically the same as those in Example 1, except for no addition of 2,2-difluoro-1,3-malonic acid in step (1), from which the finally obtained fully dull polyester drawn yarn has an intrinsic viscosity drop of 11.1% after stored at 25° C. and R.H. 65% for 60 months, and the other property indices are listed in Table 1.

Comparison 4

A method for preparing the fully dull polyester drawn yarns involved steps basically the same as those in Example 1, except for no addition of doped $Bi_2O_3$ in step (1), from which the finally obtained fully dull polyester drawn yarn has an intrinsic viscosity drop of 12.7% after stored at 25° C. and R.H. 65% for 60 months, and the other property indices are listed in Table 1.

Comparison 5

A method for preparing the fully dull polyester drawn yarns involved steps basically the same as those in Example 1, except for no addition of multiphase solid acid base $SiO_2$—$Al_2O_3$ in step (1), from which the finally obtained fully dull polyester drawn yarn has an intrinsic viscosity drop of 13.2% after stored at 25° C. and R.H. 65% for 60 months, and the other property indices are listed in Table 1.

Based on the comparative analysis between Example 1 and Comparison 1-5, it could be found that the incorporation of addition of 2,5,6,6-tetramethyl-2,5-heptanediol, 2,2-difluoro-1,3-malonic acid, multiphase solid acid base $SiO_2$-$Al_2O_3$ and doped $Bi_2O_3$ will significantly improve the natural degradation performance of polyester fiber, in which doped $Bi_2O_3$ increases the conductivity of oxygen ion and the oxygen reduction extent, 2,2-difluoro-1,3-malonic acid reduces the electron cloud density of C—O bond, solid acid base $SiO_2$—$Al_2O_3$ releases nucleophilic ion $OH^-$, and 2,5,6,6-tetramethyl-2,5-heptanediol enlarges the free volume favorable to the penetration of air and water. All those effects can promote the nucleophilic addition involved in polyester hydrolysis and synergistically improve the degradation polyester without decaying the processability and mechanical property of the fiber.

Comparison 6

A method for preparing the fully dull polyester drawn yarn involved steps basically the same as those in Example 1, except for using 1,2-dodecyl glycol instead of 2,5,6,6-tetramethyl-2,5-heptanediol in step (1), from which the finally obtained fully dull polyester yarn possesses the mechanical performance indices of monofilament fineness 2.95 dtex, breaking strength 2.2 cN/dtex, elongation at break 45.1%, interlacing degree 22/m, linear density deviation rate 0.82%, breaking strength CV value 6.5%, breaking elongation CV value 10.4%, and boiling water shrinkage rate 40.5%, as well as an intrinsic viscosity drop of 13.7% after stored at 25° C. and R.H. 65% for 60 months The comparison with Example 1 shows that 2,2,5,5-tetramethyl-3,4-hexanediol and 2,5,6,6-tetramethyl-2,5-heptanediol are more efficient than 1,2-dodecyl glycol on improving the dyeing performances of the wool-like polyester filament, and the reason on one hand is that the short side chain can enlarge the void free volume whereas the long side can mainly enlarge the slit free volume, and the void free volume is more efficient than the slit one for the penetration of dye particles into the fiber, on the other hand, the short side chain with higher rigidity will seldom cause the molecular chain entanglement and gain more free volume in the molecular aggregate.

Example 2

A method for preparing the fully dull polyester drawn yarns, comprising the steps:

(1) Preparation of modified polyester (1.1) Preparation of multiphase solid acid base $SiO_2$—MgO adding 3 wt % of disperser PEG 6000 into a sodium silicate solution with an $SiO_2$ equivalent concentration of 10 wt % and stirring the mixture at 40° C. till be soluble, then evenly adding in 10 wt % of sulfuric acid solution till pH=10, after aging for 0.5 hr continuing to add in sulfuric acid solution till pH=8, heating the solution to 90° C. and aging for 2 hr, then filtering the solution under vacuum and washing the residue with water until no $SO_4^{2-}$ detection then further washing with anhydrous ethanol for several times, finally drying the product at 80° C. and grinding it to obtain silica powder;

adding 1 part of above silica powder into 50 parts of water and stirring to disperse, then dripping in 3 parts of magnesium sulfate solution with a weight concentration of 4%, adjusting the pH value firstly to neutral and then to 8 with 0.5 mol/L sodium hydroxide solution and 8% sulfuric acid successively, after aging for 1 hr filtering the solution under vacuum and washing the residue until no $SO_4^{2-}$ detection, further washing the filter cake with anhydrous ethanol for several times and then drying it at 100° C., finally calcining the product at 400° C. for 4 hr to obtain solid acid base $SiO_2$—MgO with an average size of 0.4 micron and a silica content of 20 wt %;

(1.2) Doping modification of $Bi_2O_3$ (1.2.1) evenly mixing a 2 wt % of $Ca(NO_3)_2$ aqueous solution and a 20 wt % of $Bi_2O_3$ nitric acid solution in 5:100 molar ratio of $Ca^{2+}$ and $Bi^{3+}$;

(1.2.2) depositing the mixed solution by adding 2 mol/L of ammonia water till pH=9, then washing and drying (105° C., 2 hr) the precipitate;

(1.2.3) after the treatment composed of a heating at 400° C. for 2 hr, a heating at 700° C. for 1 hr and a cooling in air, crushing the precipitate to doped $Bi_2O_3$ powder with an average size of 0.4 micron;

(1.3) Synthesizing 2,5,6,6-tetramethyl-2,5-heptanediol (1.3.1) mixing KOH, 3-methyl-3-hydroxybutyne, 3,3-dimethyl-2-butanone and isopropyl ether in the molar ratio of 1.1:1:1.2:2.3, then carrying out the reaction in an ice bath for 2 hr, finally obtaining octyne diol through a series of processes of cooling crystallization, centrifugation, washing, refining and drying;

(1.3.2) mixing octyne diol, alcohol and Pd catalyst in the weight ratio of 2:10:0.01, then carrying out the reaction accompanied with a continuous hydrogen input at 45° C. for 50 min, finally obtaining 2,5,6,6-tetramethyl-2,5-heptanediol through a series of processes of separation and purification; wherein obtained target compound possessing a molecular structure just as shown in Formula I;

(1.4) Esterification concocting terephthalic acid, ethylene glycol, 2,5,6,6-tetramethyl-2,5-heptanediol and 2,2-difluoro-1,4-succinic acid into a slurry, then adding in multiphase solid acid base $SiO_2$—MgO, doped $Bi_2O_3$, ethylene glycol antimony, titanium dioxide and trimethyl phosphate and carrying out the esterification in a nitrogen atmosphere with a pressure of normal value at 260° C., finally ending the reaction when the water distillation reaching 95% of the theoretical value, wherein the molar ration of terephthalic acid and ethylene glycol is 1:2.0, and being relative to the amount of terephthalic acid, the total addition of 2,5,6,6-tetramethyl-2,5-heptanediol and 2,2-difluoro-1,4-succinic acid is 5 mol % in a molar ratio of 3:4, while the addition of multiphase solid acid base $SiO_2$—MgO, doped $Bi_2O_3$, ethylene glycol antimony, titanium dioxide and trimethyl phosphate are 0.05 wt %, 0.07 wt %, 0.05 wt %, 3 wt % and 0.05 wt %, respectively;

(1.5) Polycondensation for the esterification products, smoothly reducing the pressure to 450 Pa (absolute value) within 50 min and carrying out reaction at 260° C. for 50 min, successively, further reducing the pressure to 90 Pa (absolute value) and continuing the reaction at 282° C. for 90 min, finally obtaining the modified polyester with a molecular weight of 30000 and a molecular weight distribution index of 2.2;

(2) Spinning of fully dull polyester drawn yarn through a FDY technological way including stages of metering, spinneret extruding (at 295° C.), cooling (at 25° C.), oiling, stretching as well as heat setting (carried on with the parameters of interlacing pressure 0.30 MPa, godet roller 1 speed 1800 m/min, godet roller 1 temperature 80° C., godet roller 2 speed 3200 m/min, godet roller 2 temperature 130° C.), and winding (3130 m/min), converting the modified polyester into fully dull polyester drawn yarns.

Finally obtained fully dull polyester yarn has an intrinsic viscosity drop of 25% after stored at 25° C. and R.H. 65% for 60 months, and the other property indices are listed in Table 1.

Example 3

A method for preparing the fully dull polyester drawn yarns, comprising the steps:

(1) Preparation of modified polyester (1.1) Preparation of multiphase solid acid base $SiO_2$—$Al_2O_3$ adding 3 wt % of disperser PEG 6000 into a sodium silicate solution with an $SiO_2$ equivalent concentration of 10 wt % and stirring the mixture at 40° C. till be soluble, then evenly adding in 10 wt % of sulfuric acid solution till pH=10, after aging for 0.5 hr continuing to add in sulfuric acid solution till pH=8, heating the solution to 90° C. and aging for 2 hr, then filtering the solution under vacuum and washing the residue with water until no $SO_4^{2-}$ detection then further washing with anhydrous ethanol for several times, finally drying the product at 85° C. and grinding it to obtain silica powder;

adding 1 part of above silica powder into 60 parts of water and stirring to disperse, then dripping in 2 parts of aluminum sulfate solution with a weight concentration of 4%, adjusting the pH value firstly to neutral and then to 8 with 1.0 mol/L sodium hydroxide solution and 10% sulfuric acid successively, after aging for 2 hr filtering the solution under vacuum and washing the residue until no $SO_4^{2-}$ detection, further washing the filter cake with anhydrous ethanol for several times and then drying it at 100° C., finally calcining the product at 700° C. for 2 hr to obtain solid acid base $SiO_2$—$Al_2O_3$ with an average size of 0.4 micron and a silica content of 60 wt %;

(1.2) Doping modification of $Bi_2O_3$ (1.2.1) evenly mixing a 3 wt % of $Ca(NO_3)_2$ aqueous solution and a 25 wt % of $Bi_2O_3$ nitric acid solution in 8:100 molar ratio of $Ca^{2+}$ and $Bi^{3+}$;

(1.2.2) depositing the mixed solution by adding 2 mol/L of ammonia water till pH=9, then washing and drying (110° C., 3 hr) the precipitate;

(1.2.3) after the treatment composed of a heating at 400° C. for 3 hr, a heating at 700° C. for 2 hr and a cooling in air, crushing the precipitate to doped $Bi_2O_3$ powder with an average size of 0.4 micron;

(1.3) Synthesizing 2,5,6,6-tetramethyl-2,5-heptanediol (1.3.1) mixing KOH, 3-methyl-3-hydroxybutyne, 3,3-dimethyl-2-butanone and isopropyl ether in the molar ratio of 1.2:1:1.25:2.0, then carrying out the reaction in an ice bath for 3 hr, finally obtaining octyne diol through a series of processes of cooling crystallization, centrifugation, washing, refining and drying;

(1.3.2) mixing octyne diol, alcohol and Pd catalyst in the weight ratio of 3:10:0.03, then carrying out the reaction accompanied with a continuous hydrogen input at 40° C. for 50 min, finally obtaining 2,5,6,6-tetramethyl-2,5-heptanediol through a series of processes of separation and purification; wherein obtained target compound possessing a molecular structure just as shown in Formula I;

(1.4) Esterification concocting terephthalic acid, ethylene glycol, 2,5,6,6-tetramethyl-2,5-heptanediol and 2,2-difluoro-1,5-glutaric acid into a slurry, then adding in multiphase solid acid base $SiO_2$—$Al_2O_3$, doped $Bi_2O_3$, antimony acetate, titanium dioxide and trimethyl phosphite and carrying out the esterification in a nitrogen atmosphere with a pressure of 0.2 MPa at 255° C., finally ending the reaction when the water distillation reaching 92% of the theoretical value, wherein the molar ration of terephthalic acid and ethylene glycol is 1:1.6, and being relative to the amount of terephthalic acid, the total addition of 2,5,6,6-tetramethyl-2,5-heptanediol and 2,2-difluoro-1,5-glutaric acid is 4 mol % in a molar ratio of 2:4, while the addition of multiphase solid acid base $SiO_2$—$Al_2O_3$, doped $Bi_2O_3$, antimony acetate, titanium dioxide and trimethyl phosphite are 0.04 wt %, 0.055 wt %, 0.04 wt %, 2.5 wt % and 0.03 wt %, respectively;

(1.5) Polycondensation for the esterification products, smoothly reducing the pressure to 480 Pa (absolute value) within 40 min and carrying out reaction at 255° C. for 40 min, successively, further reducing the pressure to 95 Pa (absolute value) and continuing the reaction at 276° C. for 70 min, finally obtaining the modified polyester with a molecular weight of 27000 and a molecular weight distribution index of 2.0;

(2) Spinning of fully dull polyester drawn yarn through a FDY technological way including stages of metering, spinneret extruding (at 290° C.), cooling (at 22° C.), oiling, stretching as well as heat setting (carried on with the parameters of interlacing pressure 0.25 MPa, godet roller 1 speed 1700 m/min, godet roller 1 temperature 75° C., godet roller 2 speed 3100 m/min, godet roller 2 temperature 118° C.), and winding (3030 m/min), converting the modified polyester into fully dull polyester drawn yarns.

Finally obtained fully dull polyester yarn has an intrinsic viscosity drop of 21% after stored at 25° C. and R.H. 65% for 60 months, and the other property indices are listed in Table 1.

Example 4

A method for preparing the fully dull polyester drawn yarns, comprising the steps:

(1) Preparation of modified polyester (1.1) Preparation of multiphase solid acid base $SiO_2$—MgO adding 4 wt % of disperser PEG 6000 into a sodium silicate solution with an $SiO_2$ equivalent concentration of 14 wt % and stirring the mixture at 45° C. till be soluble, then evenly adding in 13 wt % of sulfuric acid solution till pH=10, after aging for 1.0 hr continuing to add in sulfuric acid solution till pH=8, heating the solution to 95° C. and aging for 2 hr, then filtering the solution under vacuum and washing the residue with water until no $SO_4^{2-}$ detection then further washing with anhydrous ethanol for several times, finally drying the product at 85° C. and grinding it to obtain silica powder;

adding 1 part of above silica powder into 57 parts of water and stirring to disperse, then dripping in 2 parts of magnesium sulfate solution with a weight concentration of 4%, adjusting the pH value firstly to neutral and then to 8 with 0.8 mol/L sodium hydroxide solution and 9% sulfuric acid successively, after aging for 1.5 hr filtering the solution under vacuum and washing the residue until no $SO_4^{2-}$ detection, further washing the filter cake with anhydrous ethanol for several times and then drying it at 100° C., finally calcining the product at 600° C. for 4 hr to obtain solid acid base $SiO_2$—MgO with an average size of 0.4 micron and a silica content of 45 wt %;

(1.2) Doping modification of $Bi_2O_3$ (1.2.1) evenly mixing a 2.5 wt % of $Ca(NO_3)_2$ aqueous solution and a 25 wt % of $Bi_2O_3$ nitric acid solution in 8:100 molar ratio of $Ca^{2+}$ and $Bi^{3+}$;

(1.2.2) depositing the mixed solution by adding 2 mol/L of ammonia water till pH=10, then washing and drying (110° C., 3 hr) the precipitate;

(1.2.3) after the treatment composed of a heating at 400° C. for 2.5 hr, a heating at 700° C. for 2 hr and a cooling in air, crushing the precipitate to doped $Bi_2O_3$ powder with an average size of 0.4 micron;

(1.3) Synthesizing 2,5,6,6-tetramethyl-2,5-heptanediol (1.3.1) mixing KOH, 3-methyl-3-hydroxybutyne, 3,3-dimethyl-2-butanone and isopropyl ether in the molar ratio of 1.2:1:1.3:2.5, then carrying out the reaction in an ice bath for 3 hr, finally obtaining octyne diol through a series of processes of cooling crystallization, centrifugation, washing, refining and drying;

(1.3.2) mixing octyne diol, alcohol and Pd catalyst in the weight ratio of 2.5:10:0.02 then carrying out the reaction accompanied with a continuous hydrogen input at 45° C. for 60 min, finally obtaining 2,5,6,6-tetramethyl-2,5-heptanediol through a series of processes of separation and purification; wherein obtained target compound possessing a molecular structure just as shown in Formula I;

(1.4) Esterification concocting terephthalic acid, ethylene glycol, 2,5,6,6-tetramethyl-2,5-heptanediol and 2,2,3,3-tetrafluoro-1,4-succinic acid into a slurry, then adding in multiphase solid acid base $SiO_2$—MgO, doped $Bi_2O_3$, ethylene glycol antimony, titanium dioxide and triphenyl phosphate and carrying out the esterification in a nitrogen atmosphere with a pressure of 0.25 MPa at 250° C., finally ending the reaction when the water distillation reaching 94% of the theoretical value, wherein the molar ration of terephthalic acid and ethylene glycol is 1:1.9, and being relative to the amount of terephthalic acid, the total addition of 2,5,6,6-tetramethyl-2,5-heptanediol and 2,2,3,3-tetrafluoro-1,4-succinic acid is 5 mol % in a molar ratio of 2.5:3.5, while the addition of multiphase solid acid base $SiO_2$—MgO, doped $Bi_2O_3$, ethylene glycol antimony, titanium dioxide and triphenyl phosphate are 0.03 wt %, 0.04 wt %, 0.03 wt %, 2 wt % and 0.05 wt %, respectively;

(1.5) Polycondensation for the esterification products, smoothly reducing the pressure to 480 Pa (absolute value) within 35 min and carrying out reaction at 258° C. for 45 min, successively, further reducing the pressure to 96 Pa (absolute value) and continuing the reaction at 270° C. for 55 min, finally obtaining the modified polyester with a molecular weight of 26000 and a molecular weight distribution index of 1.9;

(2) Spinning of fully dull polyester drawn yarn through a FDY technological way including stages of metering, spinneret extruding (at 285° C.), cooling (at 25° C.), oiling, stretching as well as heat setting (carried on with the parameters of interlacing pressure 0.25 MPa, godet roller 1 speed 1800 m/min, godet roller 1 temperature 75° C., godet roller 2 speed 3100 m/min, godet roller 2 temperature 105° C.), and winding (2950 m/min), converting the modified polyester into fully dull polyester drawn yarns.

Finally obtained fully dull polyester yarn has an intrinsic viscosity drop of 18% after stored at 25° C. and R.H. 65% for 60 months, and the other property indices are listed in Table 1.

Example 5

A method for preparing the fully dull polyester drawn yarns, comprising the steps:
(1) Preparation of modified polyester
(1.1) Preparation of multiphase solid acid base $SiO_2$—MgO
adding 5 wt % of disperser PEG 6000 into a sodium silicate solution with an $SiO_2$ equivalent concentration of 15 wt % and stirring the mixture at 45° C. till be soluble, then evenly adding in 10 wt % of sulfuric acid solution till pH=10, after aging for 1.0 hr continuing to add in sulfuric acid solution till pH=8, heating the solution to 95° C. and aging for 2 hr, then filtering the solution under vacuum and washing the residue with water until no $SO_4^{2-}$ detection then further washing with anhydrous ethanol for several times, finally drying the product at 85° C. and grinding it to obtain silica powder;
adding 1 part of above silica powder into 59 parts of water and stirring to disperse, then dripping in 2 parts of magnesium sulfate solution with a weight concentration of 4%, adjusting the pH value firstly to neutral and then to 8 with 0.7 mol/L sodium hydroxide solution and 10% sulfuric acid successively, after aging for 2 hr filtering the solution under vacuum and washing the residue until no $SO_4^{2-}$ detection, further washing the filter cake with anhydrous ethanol for several times and then drying it at 100° C., finally calcining the product at 650° C. for 3.5 hr to obtain solid acid base $SiO_2$—MgO with an average size of 0.45 micron and a silica content of 51 wt %;
(1.2) Doping modification of $Bi_2O_3$
(1.2.1) evenly mixing a 2.5 wt % of $Ca(NO_3)_2$ aqueous solution and a 24 wt % of $Bi_2O_3$ nitric acid solution in 6:100 molar ratio of $Ca^{2+}$ and $Bi^{3+}$;
(1.2.2) depositing the mixed solution by adding 2 mol/L of ammonia water till pH=10, then washing and drying (107° C., 2.5 hr) the precipitate;
(1.2.3) after the treatment composed of a heating at 400° C. for 2.5 hr, a heating at 700° C. for 2 hr and a cooling in air, crushing the precipitate to doped $Bi_2O_3$ powder with an average size of 0.45 micron;
(1.3) Synthesizing 2,5,6,6-tetramethyl-2,5-heptanediol
(1.3.1) mixing KOH, 3-methyl-3-hydroxybutyne, 3,3-dimethyl-2-butanone and isopropyl ether in the molar ratio of 1:1:1.3:3.0, then carrying out the reaction in an ice bath for 4 hr, finally obtaining octyne diol through a series of processes of cooling crystallization, centrifugation, washing, refining and drying;
(1.3.2) mixing octyne diol, alcohol and Pd catalyst in the weight ratio of 2.5:10:0.02 then carrying out the reaction accompanied with a continuous hydrogen input at 50° C. for 55 min, finally obtaining 2,5,6,6-tetramethyl-2,5-heptanediol through a series of processes of separation and purification; wherein obtained target compound possessing a molecular structure just as shown in Formula I;
(1.4) Esterification
concocting terephthalic acid, ethylene glycol, 2,5,6,6-tetramethyl-2,5-heptanediol and 2,2-difluoro-1,3-malonic acid into a slurry, then adding in multiphase solid acid base $SiO_2$—MgO, doped $Bi_2O_3$, antimony acetate, titanium dioxide and triphenyl phosphate and carrying out the esterification in a nitrogen atmosphere with a pressure of 0.15 MPa at 260° C., finally ending the reaction when the water distillation reaching 96% of the theoretical value, wherein the molar ration of terephthalic acid and ethylene glycol is 1:2.0, and being relative to the amount of terephthalic acid, the total addition of 2,5,6,6-tetramethyl-2,5-heptanediol and 2,2-difluoro-1,3-malonic acid is 3 mol % in a molar ratio of 2:4, while the addition of multiphase solid acid base $SiO_2$—MgO, doped $Bi_2O_3$, ethylene glycol antimony, titanium dioxide and triphenyl phosphate are 0.04 wt %, 0.05 wt %, 0.04 wt %, 3 wt % and 0.04 wt %, respectively;
(1.5) Polycondensation
for the esterification products, smoothly reducing the pressure to 480 Pa (absolute value) within 50 min and carrying out reaction at 255° C. for 50 min, successively, further reducing the pressure to 95 Pa (absolute value) and continuing the reaction at 282° C. for 80 min, finally obtaining the modified polyester with a molecular weight of 29000 and a molecular weight distribution index of 2.1;
(2) Spinning of fully dull polyester drawn yarn
through a FDY technological way including stages of metering, spinneret extruding (at 285° C.), cooling (at 25° C.), oiling, stretching as well as heat setting (carried on with the parameters of interlacing pressure 0.25 MPa, godet roller 1 speed 1800 m/min, godet roller 1 temperature 75° C., godet roller 2 speed 3100 m/min, godet roller 2 temperature 105° C.), and winding (2950 m/min), converting the modified polyester into fully dull polyester drawn yarns.

Finally obtained fully dull polyester yarn has an intrinsic viscosity drop of 18% after stored at 25° C. and R.H. 65% for 60 months, and the other property indices are listed in Table 1.

Example 6

A method for preparing the fully dull polyester drawn yarns, comprising the steps:
(1) Preparation of modified polyester
(1.1) Doping modification of $Bi_2O_3$
(a) evenly mixing a 3 wt % of $Ca(NO_3)_2$ aqueous solution and a 24 wt % of $Bi_2O_3$ nitric acid solution, maintaining a 7:100 of molar ratio of $Ca^2$ and $Bi^{3+}$;
(b) depositing the mixed solution by adding 2 mol/L of ammonia water until pH value reaches 10, then washing and drying (110° C., 2.5 hr) the precipitate;
(c) after the treatment composed of a heating at 400° C. for 3 hr, a heating at 700° C. for 1.5 hr and a cooling in air, crushing the precipitate to doped $Bi_2O_3$ powder with an average size of 0.45 m;
(1.2) Esterification
concocting terephthalic acid, ethylene glycol, tetramethyldisiloxane diol and 2,2-difluoro-1,4-succinic acid into a slurry (in which the molar ration of terephthalic acid and ethylene glycol is 1:2.0, the total addition of tetramethyldisiloxane diol and 2,2-difluoro-1,4-succinic acid with a molar ratio of 3:5 is 4.5 mol % relative to the amount of terephthalic acid), and adding in 0.07 wt % of the doped $Bi_2O_3$, 0.04 wt % of antimony trioxide, 0.20 wt % of titanium dioxide and 0.05 wt % of trimethyl phosphite (all are relative to the amount of terephthalic acid), then carrying out the esterification in nitrogen under a normal pressure at 260° C., finally ending the reaction when the water distillation rate reaches 91% of the theoretical value;
(1.3) Polycondensation
after smoothly reducing the pressure from normal value to 450 Pa within 35 min, conducting the low vacuum polycondensation for the esterification products at 270° C. for 50 min, then further reducing the pressure to 100 Pa and continuing the high vacuum polycondensation at 275° C. for 85 min, finally obtaining the modified polyester with a molecular weight of 27800 and a molecular weight distribution index of 1.8;

(2) Spinning of fully dull polyester drawn yarn through a FDY technological way including stages of metering, spinneret extruding (at 295° C.), cooling (at 18° C.), oiling, stretching as well as heat setting (carried on with the parameters of interlacing pressure 0.20 MPa, godet roller 1 speed 2300 m/min, godet roller 1 temperature 80° C., godet roller 2 speed 4400 m/min, godet roller 2 temperature 130° C.), and winding (4420 m/min), converting the modified polyester into fully dull polyester drawn yarns with the mechanical performance indices of monofilament fineness 2.5 dtex, breaking strength 3.5 cN/dtex, elongation at break 33.0%, interlacing degree 11/m, linear density deviation rate 1.0%, breaking strength CV value 5.0%, breaking elongation CV value 8.2%, and boiling water shrinkage rate 6.5%;

with the dyeing performance indices of dye uptake 91.8% (at 120° C.), K/S value 25.56, color fastness to soaping level 5, color fastness to dry crocking level 5, and color fastness to wet crocking level 6;

and with an intrinsic viscosity drop by 22% when stored at 25° C. and R.H. 65% for 60 months.

Example 7

A method for preparing the fully dull polyester drawn yarns, comprising the steps:

(1) Preparation of modified polyester (1.1) Doping modification of $Bi_2O_3$ (a) evenly mixing a 2.5 wt % of $Ca(NO_3)_2$ aqueous solution and a 25 wt % of $Bi_2O_3$ nitric acid solution, maintaining a 8:100 of molar ratio of $Ca^{2+}$ and $Bi^3$;

(b) depositing the mixed solution by adding 2 mol/L of ammonia water until pH value reaches 10, then washing and drying (110° C., 3 hr) the precipitate;

(c) after the treatment composed of a heating at 400° C. for 3 hr, a heating at 700° C. for 2 hr and a cooling in air, crushing the precipitate to doped $Bi_2O_3$ powder with an average size of 0.45 m;

(1.2) Esterification concocting terephthalic acid, ethylene glycol, tetramethyldisiloxane diol and 2,2-difluoro-1,5-glutaric acid into a slurry (in which the molar ration of terephthalic acid and ethylene glycol is 1:1.3, the total addition of tetramethyldisiloxane diol and 2,2-difluoro-1,5-glutaric acid with a molar ratio of 2.5:3 is 5 mol % relative to the amount of terephthalic acid), and adding in 0.06 wt % of the doped $Bi_2O_3$, 0.04 wt % of antimony trioxide, 0.21 wt % of titanium dioxide and 0.01 wt % of trimethyl phosphate (all are relative to the amount of terephthalic acid), then carrying out the esterification under a 0.3 MPa of nitrogen pressure at 260° C., finally ending the reaction when the water distillation rate reaches 99% of the theoretical value;

(1.3) Polycondensation after smoothly reducing the pressure from normal value to 500 Pa within 45 min, conducting the low vacuum polycondensation for the esterification products at 280° C. for 50 min, then further reducing the pressure to 90 Pa and continuing the high vacuum polycondensation at 277° C. for 90 min, finally obtaining the modified polyester with a molecular weight of 30000 and a molecular weight distribution index of 2.2;

(2) Spinning of fully dull polyester drawn yarn through a FDY technological way including stages of metering, spinneret extruding (at 295° C.), cooling (at 22° C.), oiling, stretching as well as heat setting (carried on with the parameters of interlacing pressure 0.30 MPa, godet roller 1 speed 2700 m/min, godet roller 1 temperature 86° C., godet roller 2 speed 4500 m/min, godet roller 2 temperature 135° C.), and winding (4130 m/min), converting the modified polyester into fully dull polyester drawn yarns with the mechanical performance indices of monofilament fineness 1.2 dtex, breaking strength 3.5 cN/dtex, elongation at break 32.0%, interlacing degree 13/m, linear density deviation rate 0.88%, breaking strength CV value 4.5%, breaking elongation CV value 9.0%, and boiling water shrinkage rate 7.0%;

with the dyeing performance indices of dye uptake 87.5% (at 120° C.), K/S value 23.55, color fastness to soaping level 5, color fastness to dry crocking level 5, and color fastness to wet crocking level 6;

and with an intrinsic viscosity drop by 26% when stored at 25° C. and R.H. 65% for 60 months.

What is claimed is:

1. A preparing method for a fully dull polyester drawn yarn, comprising: manufacturing a fully drawn yarn (FDY) with a modified polyester;

wherein the modified polyester is a product of esterification and successive polycondensation reactions of an evenly mixed mixture of terephthalic acid, ethylene glycol, 2,5,6,6-tetramethyl-2,5-heptanediol, a fluorinated dicarboxylic acid, a matting agent, a calcined multiphase solid acid base powder and a doped $Bi_2O_3$ powder;

wherein the 2,5,6,6-tetramethyl-2,5-heptanediol has a molecular formula of

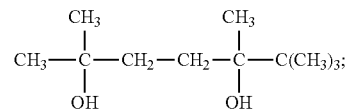

wherein the fluorinated dicarboxylic acid is selected from the group consisting of 2,2-difluoro-1,3-malonic acid, 2,2-difluoro-1,4-succinic acid, 2,2-difluoro-1,5-glutaric acid and 2,2,3,3-tetrafluoro-1,4-succinic acid;

wherein the matting agent has an additive amount equal to or larger than 2 wt % of the evenly mixed mixture;

wherein the calcined multiphase solid acid base powder is $SiO_2$—$Al_2O_3$ and/or $SiO_2$—MgO calcined at 400-700° C.;

wherein the doped $Bi_2O_3$ powder is obtained through a process of evenly mixing a $Ca^{2+}$ solution and a $Bi^{3+}$ solution to form an evenly mixed solution, then adding a precipitant to the evenly mixed solution until pH=9-10 to obtain a precipitate, and finally calcining the precipitate.

2. The preparing method of claim 1, wherein the $Ca^{2+}$ solution is an aqueous one with a concentration of 2-3%, an anion in the $Ca^{2+}$ solution is $NO_3^-$; wherein the $Bi^{3+}$ solution is a product of dissolving 20-25 wt % of $Bi_2O_3$ in nitric acid; wherein the precipitant is ammonia water with a concentration of 2 mol/L; wherein the evenly mixed solution has a (5-8):100 molar ratio of $Ca^{2+}$ with respective to $Bi^{3+}$ before precipitation;

wherein the calcining is a high temperature treatment for 2-4 hrs; wherein the $SiO_2$—$Al_2O_3$ or $SiO_2$—MgO has a SiO₂ content of 20-60 wt % and an average size of less than 0.5 micron after the calcining.

3. The preparing method of claim 2, wherein the 2,5,6,6-tetramethyl-2,5-heptanediol is synthesized by means of:
(1) mixing KOH, 3-methyl-3-hydroxybutyne, 3,3-dimethyl-2-butanone and isopropyl ether in a molar ratio of (1-1.2):1:(1.2-1.3):(2.0-3.0), then carrying out a first reaction in an ice bath for 2-4 hrs, finally obtaining octyne diol through a series of processes of cooling crystallization, centrifugation, washing, refining and drying;
(2) mixing the octyne diol, an alcohol and a Pd catalyst at a weight ratio of (2-3):10:(0.01-0.03), then carrying out a second reaction accompanied with a continuous hydrogen input at 40-50° C. for 50-60 min, finally obtaining the 2,5,6,6-tetramethyl-2,5-heptanediol through a series of processes of separation and purification.

4. The preparing method of claim 3, wherein the modified polyester is manufactured through following steps:
(1) Esterification
concocting the terephthalic acid, the ethylene glycol, the 2,5,6,6-tetramethyl-2,5-heptanediol and the fluorinated dicarboxylic acid into a slurry, then adding the calcined multiphase solid acid base powder, the doped $Bi_2O_3$ powder, a catalyst, the matting agent and a stabilizer in the slurry and carrying out the esterification in a nitrogen atmosphere with a pressure of normal value-0.3 MPa at 250-260°, and finally ending the esterification when a water distillation rate reaches more than 90% of a theoretical value;
(2) Polycondensation
for products of the esterification, smoothly reducing the pressure to less than 500 Pa (absolute value) within 30-50 min and carrying out the successive polycondensation reactions at 250-260° C. for 30-50 min, further reducing the pressure to less than 100 Pa (absolute value) and continuing the successive polycondensation reactions at 270-282° C. for 50-90 min.

5. The preparing method of claim 4, wherein a molar ratio of the terephthalic acid and the ethylene glycol is 1:(1.2-2.0), and a total addition of the 2,5,6,6-tetramethyl-2,5-heptanediol and the fluorinated dicarboxylic acid is 3-5 mol % of an amount of the terephthalic acid, a molar ratio of the 2,5,6,6-tetramethyl-2,5-heptanediol and the fluorinated dicarboxylic acid is 2-3:3-4, while an amount of the calcined multiphase solid acid base powder, the doped $Bi_2O_3$ powder, the catalyst, the matting agent and the stabilizer are 0.03-0.05 wt %, 0.04-0.07 wt %, 0.03-0.05 wt %, 2-3 wt % and 0.01-0.05 wt % of the amount of the terephthalic acid, respectively.

6. The preparing method of claim 5, wherein the catalyst is selected from the group consisting of antimony trioxide, ethylene glycol antimony and antimony acetate, wherein the matting agent is titanium dioxide, and wherein the stabilizer is selected from the group consisting of triphenyl phosphate, trimethyl phosphate and trimethyl phosphite.

7. The preparing method claim 6, wherein the modified polyester has a molecular weight of 25000-30000 and a molecular weight distribution index of 1.8-2.2.

8. The preparing method of claim 1, wherein a FDY process includes the steps of metering, spinneret extruding, cooling, oiling, stretching, heat setting and winding;
wherein the FDY process involves the following parameters: a spinning temperature of 285-295° C., a cooling temperature of 20-25° C., an interlacing pressure of 0.20-0.30 MPa, a first godet roller speed of 1600-1800 m/min, a first godet roller temperature of 70-80° C., a second godet roller speed of 3000-3200 m/min, a second godet roller temperature of 105-130° C., a winding speed of 2950-3130 m/min.

9. A fully dull polyester drawn yarn prepared by the preparing method of claim 1, comprising: a modified polyester FDY;
wherein the modified polyester has a molecular chain structure composed of terephthalic acid segments, ethylene glycol segments, 2,5,6,6-tetramethyl-2,5-heptanediol segments and fluorinated dicarboxylic acid segments;
wherein the modified polyester is dispersed with the matting agent, the doped $Bi_2O_3$ powder and the calcined multiphase solid acid base powder, and a content of the matting agent is equal to or larger than 2 wt %.

10. The fully dull polyester drawn yarn of claim 9, wherein the fully dull polyester drawn yarn has
mechanical performance indices of a monofilament fineness 1.0-3.0 dtex, a breaking strength ≥2.0 cN/dtex, an elongation at break 42.0±4.0%, an interlacing degree 19±4/m, a linear density deviation rate ≤1.0%, a breaking strength CV value ≤8.0%, a breaking elongation CV value ≤10.0%, and a boiling water shrinkage rate 50.0±10.5%;
and has an intrinsic viscosity drop of 18-25% after a storage at 25° C. and R.H. 65% for 60 months.

11. The fully dull polyester drawn yarn of claim 9, wherein the $Ca^{2+}$ solution is an aqueous one with a concentration of 2-3%, an anion in the $Ca^{2+}$ solution is $NO_3^-$; wherein the $Bi^{3+}$ solution is a product of dissolving 20-25 wt % of $Bi_2O_3$ in nitric acid; wherein the precipitant is ammonia water with a concentration of 2 mol/L; wherein the evenly mixed solution has a (5-8):100 molar ratio of $Ca^{2+}$ with respective to $Bi^{3+}$ before precipitation;
wherein the calcining is a high temperature treatment for 2-4 hrs; wherein the $SiO_2$—$Al_2O_3$ or $SiO_2$—$MgO$ has a $SiO_2$ content of 20-60 wt % and an average size of less than 0.5 micron after the calcining.

12. The fully dull polyester drawn yarn of claim 11, wherein the 2,5,6,6-tetramethyl-2,5-heptanediol is synthesized by means of:
(1) mixing KOH, 3-methyl-3-hydroxybutyne, 3,3-dimethyl-2-butanone and isopropyl ether in a molar ratio of (1-1.2):1:(1.2-1.3):(2.0-3.0), then carrying out a first reaction in an ice bath for 2-4 hrs, finally obtaining octyne diol through a series of processes of cooling crystallization, centrifugation, washing, refining and drying;
(2) mixing the octyne diol, an alcohol and a Pd catalyst at a weight ratio of (2-3):10:(0.01-0.03), then carrying out a second reaction accompanied with a continuous hydrogen input at 40-50° C. for 50-60 min, finally obtaining the 2,5,6,6-tetramethyl-2,5-heptanediol through a series of processes of separation and purification.

13. The fully dull polyester drawn yarn of claim 12, wherein the modified polyester is manufactured through following steps:
(1) Esterification
concocting the terephthalic acid, the ethylene glycol, the 2,5,6,6-tetramethyl-2,5-heptanediol and the fluorinated dicarboxylic acid into a slurry, then adding the calcined multiphase solid acid base powder, the doped $Bi_2O_3$ powder, a catalyst, the matting agent and a stabilizer in the slurry and carrying out the esterification in a nitrogen atmosphere with a pressure of normal value-0.3 MPa at 250-260° C., and finally ending the esterification when a water distillation rate reaches more than 90% of a theoretical value;

(2) Polycondensation for products of the esterification, smoothly reducing the pressure to less than 500 Pa (absolute value) within 30-50 min and carrying out the successive polycondensation reactions at 250-260° C. for 30-50 min, further reducing the pressure to less than 100 Pa (absolute value) and continuing the successive polycondensation reactions at 270-282° C. for 50-90 min.

14. The fully dull polyester drawn yarn of claim 13, wherein a molar ratio of the terephthalic acid and the ethylene glycol is 1:(1.2-2.0), and a total addition of the 2,5,6,6-tetramethyl-2,5-heptanediol and the fluorinated dicarboxylic acid is 3-5 mol % of an amount of the terephthalic acid, a molar ratio of the 2,5,6,6-tetramethyl-2,5-heptanediol and the fluorinated dicarboxylic acid is 2-3:3-4, while an amount of the calcined multiphase solid acid base powder, the doped $Bi_2O_3$ powder, the catalyst, the matting agent and the stabilizer are 0.03-0.05 wt %, 0.04-0.07 wt %, 0.03-0.05 wt %, 2-3 wt % and 0.01-0.05 wt % of the amount of the terephthalic acid, respectively.

15. The fully dull polyester drawn yarn of claim 14, wherein the catalyst is selected from the group consisting of antimony trioxide, ethylene glycol antimony and antimony acetate, wherein the matting agent is titanium dioxide, and wherein the stabilizer is selected from the group consisting of triphenyl phosphate, trimethyl phosphate and trimethyl phosphite.

16. The fully dull polyester drawn yarn of claim 15, wherein the modified polyester has a molecular weight of 25000-30000 and a molecular weight distribution index of 1.8-2.2.

17. The fully dull polyester drawn yarn of claim 9, wherein a FDY process includes the steps of metering, spinneret extruding, cooling, oiling, stretching, heat setting and winding;

wherein the FDY process involves the following parameters: a spinning temperature of 285-295° C., a cooling temperature of 20-25° C., an interlacing pressure of 0.20-0.30 MPa, a first godet roller speed of 1600-1800 m/min, a first godet roller temperature of 70-80° C., a second godet roller speed of 3000-3200 m/min, a second godet roller temperature of 105-130° C., a winding speed of 2950-3130 m/min.

* * * * *